United States Patent [19]
Montgomery

[11] Patent Number: 5,617,148
[45] Date of Patent: Apr. 1, 1997

[54] FILTER BY-PASS FOR TRANSMITTING AN ADDITIONAL SIGNAL WITH A VIDEO SIGNAL

[75] Inventor: Gerald D. Montgomery, Mesa, Ariz.

[73] Assignee: WavePhore, Inc., Tempe, Ariz.

[21] Appl. No.: 415,163

[22] Filed: Mar. 31, 1995

Related U.S. Application Data

[63] Continuation of Ser. No. 75,888, Jun. 14, 1993, abandoned, which is a continuation-in-part of Ser. No. 947,134, Sep. 18, 1992, Pat. No. 5,387,941, which is a continuation-in-part of Ser. No. 715,920, Jun. 14, 1991, Pat. No. 5,327,237.

[51] Int. Cl.$^6$ ............................ H04N 7/087; H04N 7/08
[52] U.S. Cl. ............................ 348/473; 348/479
[58] Field of Search ................... 348/473–475, 348/461, 432, 433, 436, 665, 607, 608, 478, 464, 468, 476, 434, 435; 370/69.1, 123, 76.57, 121; H04N 7/087, 7/08

[56] References Cited

U.S. PATENT DOCUMENTS

| | | | |
|---|---|---|---|
| 2,838,597 | 6/1958 | De Vrijer | 178/5.2 |
| 3,529,081 | 9/1970 | Rider | 178/5.86 |
| 3,543,169 | 11/1970 | Hill | 358/171 |
| 3,632,863 | 1/1972 | Hirashima et al. | 348/473 |
| 3,679,816 | 7/1972 | Avins et al. | 358/19 |
| 3,700,793 | 10/1972 | Borsuk et al. | 178/6.8 |
| 3,726,992 | 4/1973 | Eguchi et al. | 348/461 |
| 3,845,326 | 10/1974 | Godden | 307/230 |
| 3,925,639 | 12/1975 | Hester | 235/61.11 E |
| 3,927,250 | 12/1975 | Rainger | 178/5.6 |
| 4,051,532 | 9/1977 | Hilbert et al. | 358/142 |
| 4,065,784 | 12/1977 | Rossi | 348/382 |
| 4,074,199 | 2/1978 | de Jager et al. | 325/50 |
| 4,155,039 | 5/1979 | Lechevin | 325/20 |
| 4,177,405 | 12/1979 | Chapdelaine | 315/159 |
| 4,183,054 | 1/1980 | Patisaul et al. | 358/86 |
| 4,208,630 | 6/1980 | Martinez | 375/7 |
| 4,209,748 | 6/1980 | Weber | 455/47 |

(List continued on next page.)

FOREIGN PATENT DOCUMENTS

| | | | |
|---|---|---|---|
| 0156709 | 10/1985 | European Pat. Off. | H04N 7/093 |
| 0246698 | 11/1987 | European Pat. Off. | 358/147 |
| 0263449 | 4/1988 | European Pat. Off. | H04N 11/00 |
| 0278192 | 8/1988 | European Pat. Off. | H04N 7/08 |
| 0356903 | 3/1990 | European Pat. Off. | H04N 7/04 |
| 0360615 | 3/1990 | European Pat. Off. | H04N 7/08 |
| 0365431 | 4/1990 | European Pat. Off. | H04L 5/02 |
| 0530669 | 8/1992 | European Pat. Off. | H04N 7/08 |
| 61-92084 | 5/1986 | Japan | H04N 7/08 |
| 0206990 | 9/1987 | Japan | H04N 11/020 |
| 62-236288 | 10/1987 | Japan | H04N 7/08 |
| 01089886 | 4/1989 | Japan | 358/147 |
| 03148979 | 6/1991 | Japan | H04N 7/12 |
| 92/22984 | 12/1992 | WIPO | H04N 7/08 |

OTHER PUBLICATIONS

Tomasi, Wayne, *Electronic Communications Systems: Fundamentals Through Advanced* Prentice Hall, New Jersey, 1988, p. 481.

International Search Report for International Application No. PCT/US92/03711 filed Apr. 4, 1992.

King, Patrick T., *A Novel Television Add–On Data Communication System*, Journal of the SMPTE, vol. 83, Jan. 1974, pp. 10–13.

Maebara, Akiyoshi and Seizo Tamai, *A Television Facsimile System Employing an Additional Carrier*, New Broadcasting System Research Group, Ser. No. 151, Feb. 1972.

Christiansen, M.; T. Røste; and J.N. Skalvik, *A Video Scrambler/Descrambler Concept for the PAL Format*, Journal of the Institution of Electronic and Radio Engineers, vol. 57, No. 1, Jan./Feb. 1987 pp. 27–35.

(List continued on next page.)

*Primary Examiner*—Safet Metjahic
*Attorney, Agent, or Firm*—Loeb & Loeb LLP

[57] ABSTRACT

A controlled element for spectrum attenuation or a controlled filter is disclosed that is used to aid in the insertion of a secondary signal into a video signal without distorting the blanking intervals or close captioned data contained in the blanking interval of the video signal.

14 Claims, 1 Drawing Sheet

U.S. PATENT DOCUMENTS

| | | | |
|---|---|---|---|
| 4,231,114 | 10/1980 | Dolikian | 455/49 |
| 4,354,200 | 10/1982 | Haenen et al. | 358/23 |
| 4,379,947 | 4/1983 | Warner | 179/1 GD |
| 4,424,593 | 1/1984 | Kahn | 455/47 |
| 4,450,477 | 5/1984 | Lovett | 358/86 |
| 4,479,226 | 10/1984 | Prabhu et al. | 375/1 |
| 4,513,415 | 4/1985 | Martinez | 370/92 |
| 4,538,174 | 8/1985 | Gargini et al. | 358/86 |
| 4,539,707 | 9/1985 | Jacobs et al. | 455/47 |
| 4,551,754 | 11/1985 | Meise et al. | 358/180 |
| 4,556,973 | 12/1985 | Uemura . | |
| 4,578,815 | 3/1986 | Persinotti | 455/15 |
| 4,586,078 | 4/1986 | Citta et al. | 358/86 |
| 4,591,906 | 5/1986 | Morales-Garza et al. | 358/84 |
| 4,602,279 | 7/1986 | Freeman | 358/86 |
| 4,622,694 | 11/1986 | Weber et al. | 455/47 |
| 4,626,913 | 12/1986 | Gurumurthy | 358/147 |
| 4,647,483 | 3/1987 | Ota | 358/310 |
| 4,665,431 | 5/1987 | Cooper | 358/145 |
| 4,688,097 | 8/1987 | Lin | 380/15 |
| 4,695,900 | 9/1987 | Honjo et al. | 358/310 |
| 4,745,476 | 5/1988 | Hirashima | 358/145 |
| 4,750,036 | 6/1988 | Martinez | 358/174 |
| 4,750,206 | 6/1988 | Schotz | 381/4 |
| 4,800,428 | 1/1989 | Johanndeiter et al. | 358/142 |
| 4,805,020 | 2/1989 | Greenberg | 358/142 |
| 4,807,031 | 2/1989 | Broughton et al. | 358/142 |
| 4,831,443 | 5/1989 | Heinz | 348/478 |
| 4,855,811 | 8/1989 | Isuardi | 348/433 |
| 4,879,606 | 11/1989 | Walter et al. | 358/330 |
| 4,884,139 | 11/1989 | Pommier | 358/142 |
| 4,958,230 | 9/1990 | Jonnalagadda et al. | 358/186 |
| 4,969,041 | 11/1990 | O'Grady et al. | 358/142 |
| 4,985,769 | 1/1991 | Yasumoto et al. | 358/141 |
| 5,014,125 | 5/1991 | Pocock et al. | 358/86 |
| 5,057,920 | 10/1991 | Wilkinson | 358/171 |
| 5,063,446 | 11/1991 | Gibson | 358/142 |
| 5,075,773 | 12/1991 | Pullen et al. | 358/141 |
| 5,103,297 | 4/1992 | Yamade | 358/31 |
| 5,136,411 | 8/1992 | Paik et al. | 359/125 |
| 5,142,354 | 8/1992 | Suzuki et al. | 358/34 |
| 5,157,359 | 10/1992 | Nogami et al. | 332/117 |
| 5,157,491 | 10/1992 | Kassatly | 358/146 |
| 5,172,413 | 12/1992 | Bradley et al. | 380/20 |
| 5,177,604 | 1/1993 | Martinez | 358/86 |
| 5,200,822 | 4/1993 | Bronfin et al. | 358/142 |
| 5,243,423 | 9/1993 | DeJean et al. | 358/142 |
| 5,319,455 | 6/1994 | Hoarty et al. | 348/7 |
| 5,327,237 | 7/1994 | Gerdes et al. | 348/476 |

OTHER PUBLICATIONS

Gerdes, Richard, "Using Genesys™ HDTV Technologies for Today's Expanded NTSC Service", Presented at 1990 Spring Engineering Conference, National Association of Broadcasters, Apr. 1, 1990. Atlanta, GA.

Gerdes, Richard, "Waveform Modulation as Used in Television Applications". Presented at RF Technology Expo 90, Mar. 28, 1990. Anaheim, CA.

Gerdes, Richard, "Genesys™ HDTV Technologies Expand Existing NTSC Service". Presented at the 24th Annual SMPTE Television Conference, Society of Motion Picture and Television Engineers, Jan. 1990, Lake Buena Vista, FL.

Gerdes, Richard, "Arizona Based HDTV:; The Genesys™ Technologies." Presented at Phoenix Chapter of the Society of Broadcast Engineers, Arizona Broadcasters Association Fall Meeting, Nov. 10, 1989. Phoenix, AZ.

Gerdes, Richard, "HDTV Management Timetable." Presented at Challenges in Teleproduction, The Internat'l Teleproduction Society Annual Forum, Sep. 17, 1989. Los Angeles, CA.

Gerdes, Richard, "The Use of Genesys™ Technology for HDTV". Presented at the 130th SMPTE Technical Conference, Society of Motion Picture and Television Engineers, Inc., Oct. 15–19, 1988. New York, NY.

King, Patrick T., "A Novel TV Add–On Data Communication System," I.E.E.E. Transactions on Broadcast and Television, vol. BTR–19, No. 4, pp. 225–230; Nov. 1973.

Intnl. Search Report nfor Intnl. Application No. PCT/US92/10406 filed Oct. 7, 1993.

Genesys: Transmission System for HDTV.

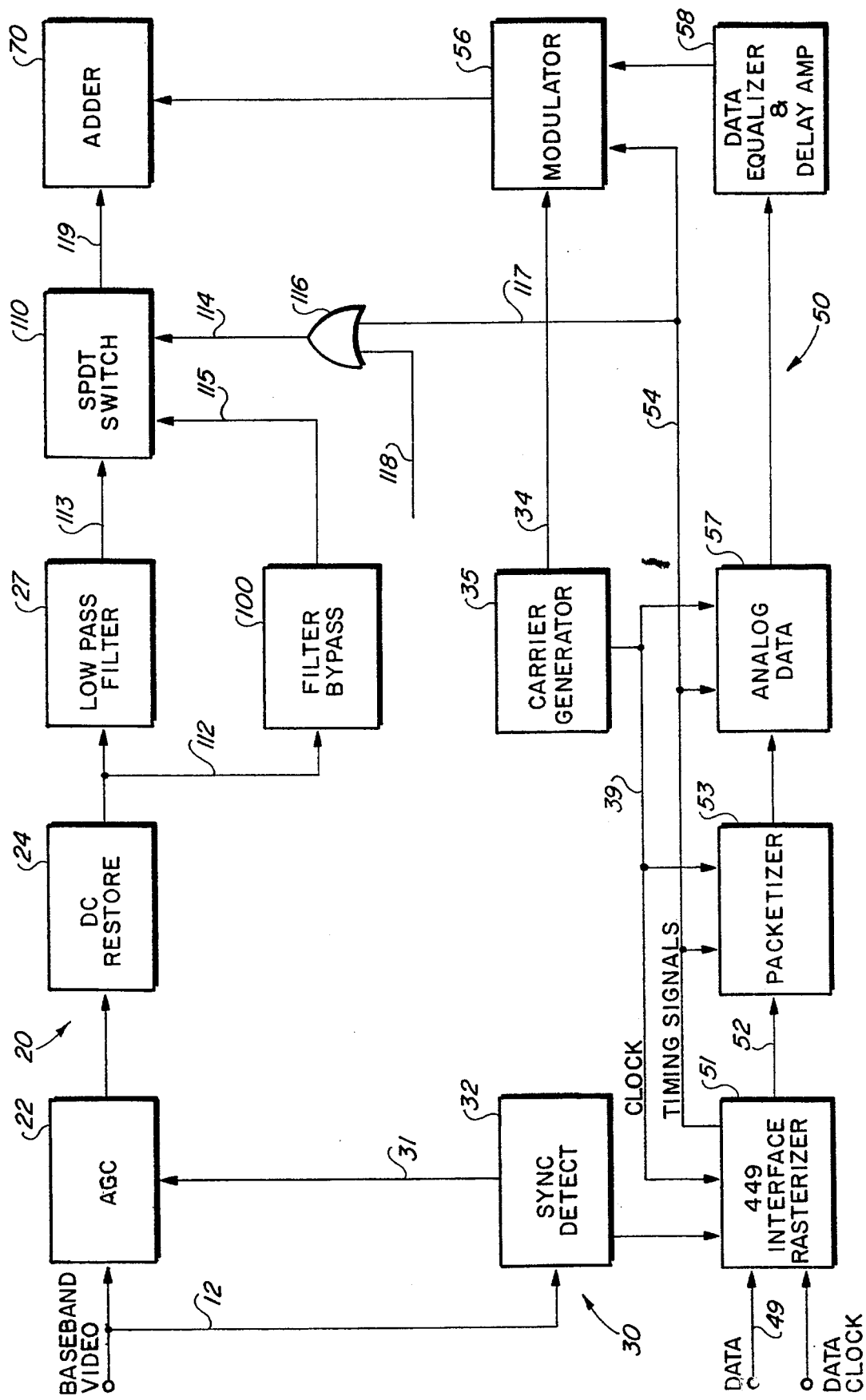

FILTER BY-PASS FOR TRANSMITTING AN ADDITIONAL SIGNAL WITH A VIDEO SIGNAL

RELATED APPLICATIONS

This is a continuation of application Ser. No. 08/075,888 filed on Jun. 14, 1993, now abandoned which is a continuation-in-part of U.S. patent application Ser. No. 07/947,134, filed Sep. 18, 1992, now U.S. Pat. No. 5,387,941 which is a continuation-in-part of U.S. patent application Ser. No. 07/715,920, filed on Jun. 14, 1991 now U.S. Pat. No. 5,327,237. This application is also related to the following applications assigned to WavePhore, Inc. and filed on the same day as this application: my U.S. patent application Ser. No. 08/076,199 entitled Transmitting A Secondary Signal with Dynamic Injection Level Control; my U.S. patent application No. 08/076,196 entitled D.C. Level Restore Circuit for A Modulator, which is mow abandoned; and my U.S. patent application Ser. No. 08/076,137, now U.S. No. 5,410,360, entitled Timing Signals for Transmitting A Secondary Dignal with Data.

BACKGROUND OF THE INVENTION

1. Field of the Invention

This invention relates to transmitting a second signal with a video signal and more particularly to transmitting two signals with a video signal.

2. Description of the Prior Art

It has long been known that the video spectrum in common commercial formats such as NTSC, PAL and SECAM is not efficiently used. Although some different formats have been proposed for more efficient use of that spectrum, most of these formats such as the Japanese HDTV format cannot be received by conventional television receivers.

One method of more efficiently using the spectrum of a video signal is to time multiplex the video signal with a data signal. This is the approach used for transmitting close captioned data with the video signal. In particular, the close captioned data is transmitted during the vertical blanking interval. Specially designed receivers may receive and display the close captioned information while more commonly available commercial receivers may display the transmitted video signal without perceptible interference from the closed caption data. However, a drawback of close captioned television transmission data is that the data rate is low.

Other schema for more efficient use of the video spectra include use of the vestigial sideband of the luminance signal. An example of this is shown in U.S. Pat. No. 4,958,230. In that patent, a comb filter is applied to the vestigial sideband of the luminance signal at the intermediate frequency. A second, luminance signal is then frequency interleaved in that vestigial sideband.

A drawback of such approaches is that the phase and delay distortion of the filtering may adversely effect the blanking interval and the data transmitted during those intervals such as close caption data. The comb filter described in U.S. Pat. No. 4,958,230 may cause intersymbol interference or the like, thereby adversely affecting reception of close captioned data.

In addition, such filtering may also adversely effect the beginning and ending of the vertical and horizontal blanking intervals. Although these effects may not cause a perceptible degradation of the received signal, the delays and phase distortion may be perceptible during the transmission of test patterns. Still further, such effects may result in an adverse impact on testing of the transmitted signal.

Such adverse effects can be particularly adverse in testing the quality of various transmission links used for transmitting video signals such as coaxial and fiber optic cable links, microwave relay links, and satellite links. The presence of such delays and phase distortion makes it difficult for test equipment and technicians to discern whether the effects are caused by the filters used for transmitting the additional signal or by the transmission link.

Therefore, it is a first object of this invention to provide a system for more efficient use of the video spectrum. It is a second object of this invention to provide for more efficient use of the spectrum without interfering with the use of the transmission of the underlying video signal or other signals such as close captioned data transmitted during the blanking intervals. It is yet a further object of the invention to permit the testing of video transmission links.

SUMMARY OF THE INVENTION

These and other objects are achieved through the use of selective control of various filtering operations used in the invention. In particular, at least some of the filters that are used for altering the video spectrum for combining with the secondary or tertiary information are temporarily altered, disconnected or by-passed during at least some portions of some of the video intervals. This eliminates intersymbol interference during blanking intervals, and distortion of test patterns and it enhances testing of the network.

The bypassing operation may be controlled by either a controllable high impedance attenuator in series with a bypass around the filters, by a voltage controlled filter or by a controllable double throw, single pole switch forming a bypass around the filters. The control lead of the switch or the attenuator or the control node of the voltage controlled filter is coupled to a control signal generated by a blanking detector. The blanking detector provides a control signal that causes the attenuator or switch to effectively remove the filter from the circuit during the blanking interval.

DESCRIPTION OF THE DRAWINGS

FIG. 1 is a block diagram of an embodiment of the invention.

DETAILED DESCRIPTION OF THE EMBODIMENTS

FIG. 1 shows an embodiment of the signal processor 10 of the transmitter that may be used for transmitting a tertiary digital data signal 49 through a transmitter with a primary NTSC color video signal 12 also containing a secondary data signal comprised of, for example, closed captioned data. Other embodiments of the invention may be used for transmitting an additional third analog signal with closed captioned data combined with an NTSC signal, for transmitting a second signal with an NTSC video signal lacking closed captioned data and for transmitting a second signal with another video format signal such as SECAM or PAL.

The embodiment of FIG. 1 is virtually identical to the embodiment in FIG. 3 of U.S. patent application Ser. No. 07/947,134 to Montgomery et al. filed on Sep. 18, 1992 and assigned to WavePhore, Inc with the notch filter omitted. The description of that embodiment on pages 17 through 21 is incorporated herein by reference. In the embodiment of FIG. 1, a second signal 49 is rasterized and modulated by the data section 50 for injection at the adder 70 into the output of the video section 20. In order for the injected modulated data signal not to interfere with the video signal supplied to the modulator 56, the low pass filter 27 substantially attenuates the video signal above the chroma subcarrier and in particular above 3.7 megahertz. That filter 27 like the comb filter referred to above for U.S. Pat. No. 4,958,230 may cause phase distortion and different delays to the input signal. The filter 27 also causes frequency distortion to test signals that may be transmitted in lieu of ordinary television programming.

The instant embodiment differs from the embodiment of FIG. 3 of U.S. patent application Ser. No. 07/947134 to Montgomery et al. filed on Sep. 18, 1992 in that a filter bypass circuit 100 is included. The filter by-pass circuit 100 includes a delay element (not shown) that equals the time duration of the delay of the filter 27 and includes a lead 112 coupled to the input of the filter 27 and a lead 115 coupled to a first throw of a single pole double throw analog switch 110. The output of the filter 27 is also coupled to a lead 113 for a second throw of the double throw switch 110. A control terminal 114 of the switch 110 is coupled to the output of the OR gate 116. The pole of the switch is coupled to a lead 119 connected to the adder 70.

Preferably, the switch is a high speed analog semiconductor switch such as is available from a variety of different semiconductor manufacturers. Alternatively, the switch 110 may also be a controllable attenuator as described below.

A delayed composite blanking signal 117 provided as one of the timing signals 54 is coupled through the OR gate 116 to the control electrode 115 of the switch 110. The delayed composite blanking signal 117 causes the switch 110 to select the by-pass element 100 instead of the filter 27 during the horizontal and vertical blanking intervals. Therefore, the filter 27 is by-passed during the blanking intervals. Hence, there is no phase distortion or frequency distortion of the video signal occurring during the horizontal or vertical blanking intervals. Nor are any signals present during the blanking intervals, such as closed captioned data and vertical interval test signals, effected by the filter 27. Thus the filter 27 attenuates a portion of the video spectrum above 3.7 Megahertz during active video lines and does not attenuate the same portion of the spectrum during the blanking intervals.

Although the filtering function has been eliminated during the blanking intervals of the video signal, the combined data and video signals do not interfere with each other during the blanking intervals because the unfiltered portion of the video signal is only present when modulated, rasterized data from the data section 50 is absent. Therefore, test engineers may use the vertical interval test signals to observe an unfiltered signal while the TV program is being observed by the subscriber and data is being transmitted.

Control signal 118 is also supplied to the OR gate 116 to control the filter. This allows system operators to bypass the filter so that during transmission link testing, test engineers can observe an unfiltered test pattern or verify performance with an unfiltered video signal when the subscriber cannot observe the video program.

A still further input (not shown) may be coupled to an input of the OR gate 116 so that the filtering may be by-passed when there is no data present to transmit. In such a situation, the IEEE 449 interface/rasterizer 51 generates the further control signal (not shown) coupled to the OR gate 116. When the buffer of the interface/rasterizer 51 has been empty long enough for all data to have been transmitted, the control signal is generated and the filter 27 is by-passed. The by-passing of the filter 27 continues until data is present at the output of the modulator 56 for transmission.

As a further alternative, instead of using a switch 110, a controllable high impedance attenuator (not shown) may be substituted therefore. In that event, the impedance of the attenuator causes the filter 27 output to be supplied during the active video intervals to the adder 27 and the output of the filter bypass circuit 100 to be provided during the blanking intervals.

In yet another alternative, the low pass filter 27 may be replaced with a voltage controlled filter, thereby eliminating the need for the switch 110 and leads 112 and 115. In that event, the output of the OR gate 116 may be coupled directly to the voltage control node of the filter so that the filter characteristics change to avoid phase distortion and filtering during the horizontal and video blanking intervals.

As a still further alternative, there may be situations in which it is considered desirable to insert the tertiary signal on only certain of the active video lines. For example, with certain versions of PAL, it has been found to be desirable to allow some of the active lines of a frame to be transmitted without the use of the low pass filter 27. In such instances, the OR gate 116 is not coupled to the delayed, composite sync signal. Rather circuitry (not shown) determines the appropriate time for data to be added to the video signal is used to bypass the filter 27 whenever data is not being sent. During the vertical blanking intervals and the intervals when data is not being sent, a control signal will be generated so that the OR gate 116 will cause the filter 27 to be by-passed. Only after those lines will a control signal be generated so that the filter will not be by-passed during the active video intervals of for example the first twenty-one lines of a frame.

Although the foregoing embodiments are directed to adding a tertiary data signal into an NTSC signal already containing a secondary signal such as close captioned data, it will be understood by those of skill in the art that the invention may be used with a regular NTSC signal without a secondary data signal. Still further, the foregoing embodiment may be used with a PAL video signal including any of the versions incorporating close captioned data or with a SECAM signal. Nonetheless, the scope of the invention is defined by the claims.

I claim:

1. In a processor for injecting a second signal into a primary video signal for subsequent transmission having a power spectrum and blanking intervals separating active video lines, the processor comprising:

a blanking interval detector responsive to the primary video signal;

a controllable element responsive to the video signal and the blanking interval detector and providing at an output an output video signal having at least one substantially attenuated portion of the power spectrum during at least some portions of the active video lines and leaving the same portion of the power signal spectrum substantially unattenuated during at least some of the blanking intervals; and a secondary section injecting the second signal into the output of the controllable element.

2. The processor of claim 1, wherein the blanking intervals are the horizontal blanking intervals.

3. In a processor for injecting a second signal into a primary video signal for subsequent transmission having a power spectrum and blanking intervals separating active video lines, the processor comprising:

a blanking interval detector responsive to the primary video signal; and a controllable element responsive to the video signal and the blanking interval detector and providing at an output an output video signal having at least one substantially attenuated portion of the power spectrum during at least some portions of the active video lines and leaving the same portion of the power signal spectrum substantially unattenuated during at least some of the blanking intervals;

wherein the controllable element is also responsive to a manual control to leave said same portion substantially unattenuated to thereby further facilitate the testing of a transmission link.

4. The processor of claim 3, wherein the blanking intervals are the horizontal blanking intervals.

5. In a processor for injecting a second signal into a primary video signal for subsequent transmission having a power spectrum and blanking intervals separating active video lines, the processor comprising:

a blanking interval detector responsive to the primary video signal; and a controllable element responsive to the video signal and the blanking interval detector and providing at an output an output video signal having at least one substantially attenuated portion of the power spectrum during at least some portions of the active video lines and leaving the same portion of the power signal spectrum substantially unattenuated during at least some of the blanking intervals;

wherein the processor includes a secondary signal section responsive to the second signal further providing an absence signal indicating the absence of a second signal; and the controllable element is responsive to the absence signal such that no attenuation occurs in response to the absence signal.

6. The processor of claim 5, wherein the blanking intervals are the horizontal blanking intervals.

7. In a processor for injecting a second signal into a primary video signal for subsequent transmission having a power spectrum and blanking intervals separating active video lines, the processor comprising:

a blanking interval detector responsive to the primary video signal; and a controllable element responsive to the video signal and the blanking interval detector and providing at an output an output video signal having at least one substantially attenuated portion of the power spectrum during at least some portions of the active video lines and leaving the same portion of the power signal spectrum substantially unattenuated during at least some of the blanking intervals;

wherein the controllable element comprises a filter responsive to the primary video signal and a controllable switch coupled to by-pass the filter during the blanking intervals so that the filter has no effect on the primary video signal.

8. The processor of claim 7, wherein the blanking intervals are the horizontal blanking intervals.

9. In a processor for injecting a second signal into a primary video signal for subsequent transmission having a power spectrum and blanking intervals separating active video lines, the processor comprising:

a blanking interval detector responsive to the primary video signal; and a controllable element responsive to the video signal and the blanking interval detector and providing at an output an output video signal having at least one substantially attenuated portion of the power spectrum during at least some portions of the active video lines and leaving the same portion of the power signal spectrum substantially unattenuated during at least some of the blanking intervals;

wherein the controllable element comprises a filter having an input and an output responsive to the primary video signal and an alterable impedance path providing a low impedance by-pass between the input and out output of the filter to thereby by-pass the filter during the blanking intervals.

10. The processor of claim 9, wherein the blanking intervals are the horizontal blanking intervals.

11. A method of combining a first video signal having a frequency spectrum and blanking intervals separating active video lines including a second signal present during only a part of at least some blanking intervals with a third signal, the method comprising:

attenuating a portion of the spectrum of the combined signal during some time intervals when the second signal is not present; and injecting the third signal into the first signal when the second signal is not present;

wherein attenuation is accomplished by a filter filtering the first video signal and wherein the method further includes bypassing the filter during said time intervals when the first signal is present.

12. The processor of claim 11, wherein the time intervals are the horizontal blanking intervals.

13. A method of injecting a second signal into a rasterized primary video signal having blanking intervals separating active video lines, the video signal having luminance and chrominance information and a chrominance subcarrier, the method comprising:

detecting the blanking intervals of the video signal;

substantially attenuating a portion of the video signal during at least part of some active video lines;

injecting the secondary signal into the portions of the video lines that are attenuated; and passing the blanking interval portions of the video signal without attenuating said portion of the video signal and without injecting the second signal;

wherein the attenuating is done by a filter that is by-passed during the blanking intervals.

14. In a processor for injecting a second signal into a primary video signal for subsequent transmission having a power spectrum and blanking intervals separating active video lines, the processor comprising:

a blanking interval detector responsive to the primary video signal; and a controllable element responsive to the video signal and the blanking interval detector and providing an output an output video signal having at least one substantially attenuated portion of the power spectrum during at least some portions of the active video lines and leaving the same portion of the power signal spectrum substantially unattenuated during at least some of the blanking intervals;

wherein the blanking detector further detects a predetermined interval in at least one field in a frame and the controllable element provides substantially no attenuation during the predetermined interval;

wherein the blanking intervals are the horizontal blanking intervals.

* * * * *